UNITED STATES PATENT OFFICE.

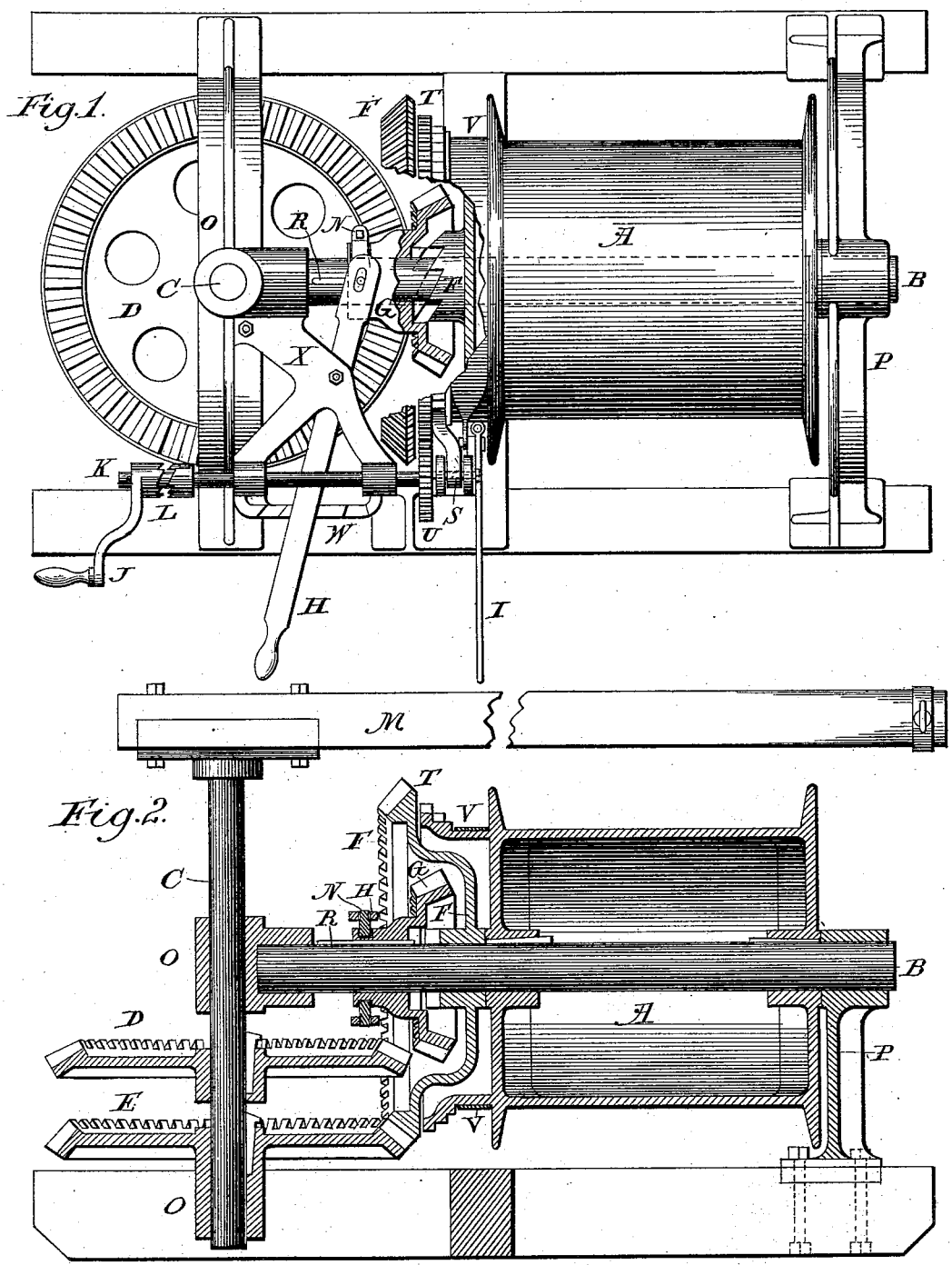

OLIVER CROSBY, OF ST. PAUL, MINNESOTA.

HOISTING-MACHINE.

SPECIFICATION forming part of Letters Patent No. 356,526, dated January 25, 1887.

Application filed April 19, 1886. Serial No. 199,427. (No model.)

*To all whom it may concern:*

Be it known that I, OLIVER CROSBY, a citizen of the United States, residing at St. Paul, Ramsey county, State of Minnesota, have invented a new and useful Hoisting-Machine, of which the following is a specification.

This invention relates to hoisting-machines; and it consists in the construction and arrangement of parts, as hereinafter shown and described, and specifically pointed out in the claim.

Figure 1 represents a top view of the machine with the sweep M removed, and Fig. 2 represents a longitudinal section.

Similar letters refer to similar parts in the two views.

O and P are cast-iron standards, provided with proper bearings for the vertical shaft C and the horizontal shaft B.

C is a vertical shaft, to which are attached the gears D and E and the sweep M.

B is a shaft, to which is rigidly attached the drum A. On this shaft runs loosely the gear F, having a clutch on its hub, as shown plainly, Fig. 1.

G is a combined gear and clutch, which, sliding on the feather R, engages with the gear and clutch F, or with the teeth on the gear D, this gear and clutch G being operated by the lever H and the collar N, the lever H being held in either of its three positions by means of notches in the piece W.

I is a lever, which operates the friction-band V.

S is a pawl working into the ratchet-wheel of the drum.

U is a pinion working into cogs on the drum at T. This pinion is revolved by shaft K and hand-crank J. At L are two ratchets, one being attached rigidly to the shaft K, the other being a part of or attached to hub of the crank J. This hub and crank revolve loosely on shaft K when not in use.

To operate the machine, the vertical shaft, with the two gears, is revolved by the motive power. By throwing the lever H to the left the teeth in the gear G are caused to engage with the teeth on the gear D. This will cause the shaft B and drum A to revolve at a greater speed than do the shaft C and gear D. In this position F will run idly on the shaft B. Throwing lever H to the left causes the clutch on the back of the gear G to engage with the clutch on the hub of the gear F. This causes the shaft B and drum A to revolve at a slower speed than when in the former position. Permitting lever H to remain in position, as shown on drawings, allows shaft C and gears D, E, and F to revolve without the shaft B and drum A, or, in other words, the drum is free to revolve, and is under the control of the friction-lever I and pawl S. By sliding the crank J into the ratchet at L the drum can be revolved by turning the crank J.

The foregoing description is for a machine using a single drum. My invention applies to hoisting-machines having two drums. To attach a second drum to this machine requires placing a shaft similar to B to the left of the vertical shaft C, this shaft to have a drum, sliding gear, and clutch similar in every way to the drum, &c., shown, and to connect with the gears D and E in the same relative positions to the left of the machine.

I am aware that prior to my invention hoisting-machines have been constructed with horizontal drums driven with gears and a vertical shaft. I therefore do not claim such a combination, broadly; but What I do claim, and desire to secure by Letters Patent, is—

In a hoisting-machine, a shaft, B, having a drum, A, fast thereon, an upright shaft, C, having bevel-gears D E, fast thereon, bevel-gear F, loose upon said shaft B and adapted to be constantly revolved by said gear E, and a combined gear and clutch, G, adapted to alternately connect gears G and D or the gear system F E with said shaft B, whereby the drum A may be revolved at different speeds or be permitted to revolve independently of the driving mechanism, substantially as and for the purpose set forth.

OLIVER CROSBY.

Witnesses:
FRANK J. JOHNSON,
W. J. H. GOODWIN.